March 5, 1929.  F. L. JORDAN  1,704,048

PROTECTING DEVICE FOR AUTOMOBILE FENDERS

Filed May 3, 1928

INVENTOR.
F. L. JORDAN,
BY Shepherd & Campbell
ATTORNEYS.

Patented Mar. 5, 1929.

1,704,048

UNITED STATES PATENT OFFICE.

FRANK L. JORDAN, OF WEEKS, LOUISIANA.

PROTECTING DEVICE FOR AUTOMOBILE FENDERS.

Application filed May 3, 1928. Serial No. 274,924.

This invention relates to protecting devices for automobile fenders, and it has for its object to provide the usual metal automobile fender with a protective covering of rubber, or other suitable material, upon its under side only. The application of such a rubber covering protects the fender from the abrasive action of particles of road material, such as gravel, dirt, and the like, deadens the noise which would be created by the striking of such particles against the metal surface, and also materially reduces vibration of the fender, with a consequent deadening of the drumming noise, which is frequently produced by an all-metal fender, under the vibration set up by the engine.

Further objects and advantages of the invention will be set forth in the detailed description which follows.

In the accompanying drawing

Like numerals designate corresponding parts in all of the figures of the drawing.

Figure 1:
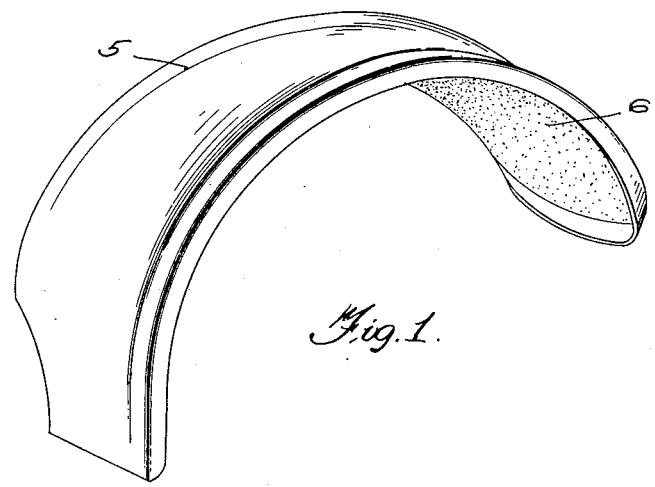
Fig. 1 is a perspective view.
Figure 2:
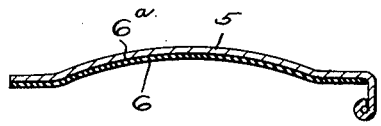
Figs. 2, 3 and 4 are transverse sectional views of automobile fenders, having the invention applied thereto.
Figure 3:
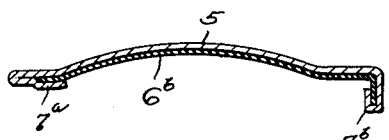

In the drawing, 5 designates an automobile fender of conventional form, in that it is made of metal and is preferably stamped from a single sheet of material. In carrying out the invention I apply to the under side of the fender a covering 6, of rubber, which, in preferred form, is relatively thin. This rubber protector may be held in place in many ways. It may be cemented or vulcanized in place, as indicated at 6ª in Fig. 2; or a sheet 6ᵇ of rubber (see Fig. 3), may be cemented to the fender 5ᵇ and, in addition, the outer edges of the rubber covering may be gripped by suitably bending the metal of the fender upon the same, as indicated at 7ª and 7ᵇ, in said Fig. 3.

Figure 4:
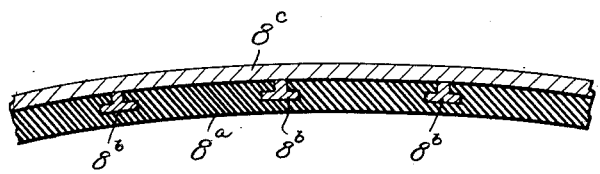

In Fig. 4 I have illustrated a rubber protecting sheet 8ª, which engages dovetailed projections 8ᵇ that are carried by the fender 8ᶜ. Many ways will readily suggest themselves to those skilled in the art for applying the rubber sheet to the fender, such as by screws, bolts, and the like, or by embedding metallic members in the sheet as suggested in Fig. 4, and then securing said members to the fender.

The utility of the present invention arises from the fact that the abrasive action of particles of gravel, dirt, grit, etc., upon the under side of the automobile fenders quickly cuts the paint, or other finishing coating from the fenders, leaving the metal to be attacked by rust, or by the chemical action of road tars, etc. The presence of the rubber sheet prevents this damage, and also aids, as previously stated, in materially reducing the drumming noise present in so many fenders.

I am aware of the fact that it has been proposed to make fenders wholly out of rubber, or to make fenders partly of rubber and partly of metal. However, structures of this nature, with which I am familiar, have involved the use of fenders in which the major portions of the exposed upper surfaces of the fender have been made of rubber. Such finishes as those produced by Duco, and other nitrocellulose lacquers and varnishes have attained such wide spread popularity that the average automobile owner will not be satisfied with any material which will not take that finish with the same measure of success that it is taken by the remainder of the body of the automobile. Therefore, no fender which does not present a complete metal upper surface would be considered by the trade. Consequently, it will be seen that the present invention provides a fender having the maximum desirability in that, in all of its exposed portions, it will take the same degree of finish that is taken by the remainder of the automobile, while those portions exposed to the action of abrasive particles thrown off by the wheels are protected. In addition, it will be observed that this same protecting element is utilized to reduce the drumming noise that would be set up by a wholly metal fender.

It is to be understood that the invention is not limited to the precise construction set forth, nor to any specific way of holding the protecting sheet in place. The rubber sheet, in addition to being moisture proof, is more highly resistant to the cutting action of gravel than a non-elastic material would be. Furthermore, it has such inherent elasticity as causes it to more effectually resist the setting up of drumming noises by the fender under vibration than would be the case with a non-elastic material.

Having described my invention, what I claim is:

The combination with a metallic automobile fender, the upper surface of which is adapted to receive a finishing coating similar to that applied to the body of an automobile by which the fender is carried, in combination with a sheet of relatively thin rubber, shaped to conform to the underside of the fender and intimately and permanently united therewith throughout its area, said rubber being impervious to the action of water and by its elasticity being itself resistant to the action of road gravel thrown thereagainst, and by its elasticity serving to deaden any tendency of the fender to create a drumming noise under road vibration.

In testimony whereof I affix my signature.

FRANK L. JORDAN.